(12) United States Patent
Lin

(10) Patent No.: US 9,541,963 B2
(45) Date of Patent: Jan. 10, 2017

(54) THIN HINGE

(71) Applicant: Sinher Technology Inc., New Taipei (TW)

(72) Inventor: Wen-Yan Lin, New Taipei (TW)

(73) Assignee: Sinher Technology Inc., New Taipei (TW)

( * ) Notice: Subject to any disclaimer, the term of this patent is extended or adjusted under 35 U.S.C. 154(b) by 0 days.

(21) Appl. No.: 14/947,432

(22) Filed: Nov. 20, 2015

(65) Prior Publication Data
US 2016/0320811 A1 Nov. 3, 2016

(30) Foreign Application Priority Data

May 1, 2015 (TW) .............................. 104206693 A

(51) Int. Cl.
*E05D 11/06* (2006.01)
*E05F 1/08* (2006.01)
(Continued)

(52) U.S. Cl.
CPC ............... *G06F 1/1681* (2013.01); *E05D 3/06* (2013.01); *E05D 7/00* (2013.01); *G06F 1/1616* (2013.01); *E05Y 2900/606* (2013.01)

(58) Field of Classification Search
CPC ............... E05D 3/06; E05D 3/16; E05D 3/14; E05D 11/1021; E05D 11/0054; E05D 11/06; E05D 2003/163; E05D 2003/166; E05D 7/00; E05D 3/02; E05D 3/18; E05D 1/04; E05F 1/14; E05F 1/002; E05F 1/1681; E05F 3/18; E05F 3/20; E05F 5/02; E05F 5/006; E05Y 2201/21; E05Y 2201/212; E05Y 2201/264; E05Y 2201/412; E05Y 2201/424; E05Y 2201/428; E05Y 2201/496;E05Y 2201/254; E05Y 2800/21; E05Y 2900/20; E05Y 2900/512; E05Y 2900/538; E05Y 2900/606; Y10T 16/2771; Y10T 16/304; Y10T 16/5383; Y10T 16/53832; Y10T 16/53833; Y10T 16/53843; Y10T 16/547; Y10T 16/5476; Y10T 16/299; Y10T 16/544; Y10T 16/5445; Y10T 16/5448; Y10T 16/5403; Y10T 16/54033; Y10T 16/540345; G06F 1/1681; G06F 1/1616

See application file for complete search history.

(56) References Cited

U.S. PATENT DOCUMENTS

| 5,103,532 | A | * | 4/1992 | Youngdale | ................ E05D 3/16 16/288 |
| 6,288,891 | B1 | * | 9/2001 | Hasegawa | .............. F16M 11/10 248/923 |

(Continued)

FOREIGN PATENT DOCUMENTS

| TW | M466462 U | 11/2013 |
| TW | M471736 U | 2/2014 |

(Continued)

*Primary Examiner* — Chuck Mah
(74) *Attorney, Agent, or Firm* — Muncy, Geissler, Olds & Lowe, P.C.

(57) ABSTRACT

A thin hinge includes a holding seat, an arc-shaped driven member and a torsional force generation assembly. The holding seat includes a base, a housing space and a linear slide track. The arc-shaped driven member is located in the housing space and includes an operational portion, a curved portion connected to the operational portion and a driving portion extended from the curved portion toward the operational portion to couple with the assembly portion. The torsional force generation assembly includes at least one driving arm connected to the arc-shaped driven member, a slide seat connected to the driving arm and located in the (Continued)

housing space corresponding to the linear slide track, a detent plate located at another side of the linear slide track facing the housing space and corresponding to the slide seat, and at least one torsional spring coupled with the slide seat and the detent plate.

12 Claims, 6 Drawing Sheets

(51) Int. Cl.
  *G06F 1/16* (2006.01)
  *E05D 3/06* (2006.01)
  *E05D 7/00* (2006.01)

(56) References Cited

U.S. PATENT DOCUMENTS

| | | | | |
|---|---|---|---|---|
| 7,197,790 B1* | 4/2007 | Edmondson | | E05D 3/16 16/286 |
| 7,406,749 B2* | 8/2008 | Herper | | E05F 5/006 16/286 |
| 8,272,104 B2* | 9/2012 | Chen | | G06F 1/1616 16/327 |
| 8,296,905 B2* | 10/2012 | Zhang | | G06F 1/1681 16/330 |
| 8,947,867 B2* | 2/2015 | Hsu | | G06F 1/1624 361/679.21 |
| 9,086,842 B2* | 7/2015 | Wen | | |
| 9,261,900 B2* | 2/2016 | Hsu | | G06F 1/16 |
| 2005/0155180 A1* | 7/2005 | Lin | | E05D 11/1021 16/287 |
| 2005/0172453 A1* | 8/2005 | Duffy | | E05D 5/062 16/307 |
| 2006/0101619 A1* | 5/2006 | Tai | | F16M 11/06 16/366 |
| 2008/0141490 A1* | 6/2008 | Lautenschlager | | E05F 5/006 16/235 |
| 2010/0000052 A1* | 1/2010 | Chung | | E05D 15/58 16/364 |
| 2010/0101052 A1* | 4/2010 | Waltemate | | E05D 3/16 16/297 |
| 2010/0269293 A1* | 10/2010 | Wisniewski | | E05D 3/14 16/250 |
| 2011/0072617 A1* | 3/2011 | Lin | | E05F 5/006 16/298 |
| 2012/0118842 A1* | 5/2012 | Salice | | E05D 3/14 211/144 |
| 2013/0152339 A1* | 6/2013 | Hung | | E05D 3/16 16/50 |
| 2013/0170122 A1* | 7/2013 | Lai | | G06F 1/16 361/679.6 |
| 2013/0239363 A1* | 9/2013 | Apur | | E05F 5/006 16/50 |
| 2014/0001941 A1* | 1/2014 | Liang | | G06F 1/1681 312/327 |
| 2014/0192505 A1* | 7/2014 | Jung | | F16M 11/10 361/809 |
| 2014/0240832 A1* | 8/2014 | Nakamura | | A61B 46/10 359/510 |
| 2015/0252602 A1* | 9/2015 | Nielsen | | E05D 11/06 16/275 |
| 2015/0267452 A1* | 9/2015 | Zetti | | E05D 3/16 16/65 |

FOREIGN PATENT DOCUMENTS

| | | |
|---|---|---|
| TW | M492378 U | 12/2014 |
| TW | M493243 U | 1/2015 |

* cited by examiner

THIN HINGE

FIELD OF THE INVENTION

The present invention relates to a hinge and particularly to a thin hinge thinning through an arc-shaped driven member.

BACKGROUND OF THE INVENTION

Flip-top electronic devices such as notebook computers, mobile phones and the like generally have a display device and a host body pivotally coupled through a hinge. In general, the hinge mainly includes an axle and two connection members hinged on the axle to couple respectively with the display device and the host body. When in use the display device can be flipped against the host body in an unfolding state to perform operation as desired. When not in use, the display device can be folded over the host body in half. Through the hinge the size of the flip-top electronic device can be greatly shrunk to facilitate storing and carrying.

Conventional hinges, such as those disclosed in R.O.C. patent Nos. M493243, M492378, M471736 and M466462, mainly include a holding seat, two axles located abreast on the holding seat to couple respectively with a display device and a host body, and two torsional force generation assemblies corresponding respectively to one of the axles. Because the two axles are arranged abreast the hinge cannot be shrunk to a smaller size. As a result, the electronic device employed the hinge also cannot be thinned as desired. In addition, the torsional force generation assembly used on the conventional hinge is formed by stacking a plurality of elastic blades, and the tightness between the elastic blades is adjusted by wrenching an adjustment nut mounted onto the torsional force generation assembly, thereby provides a swivel torsional force to the axle. However, because the conventional structure deploys the torsional force generation assembly on one of the axles, during assembly each torsional force generation assembly requires torsional force adjustment. Such a practice cannot guarantee the two axles receiving same amount of torsional force during turning. Hence there is still room for improvement.

SUMMARY OF THE INVENTION

The primary object of the present invention is to solve the problem of structural constrains of the conventional hinge that makes thinning impossible.

Another object of the invention is to solve another problem of the conventional hinge of unable to steadily generate a swivel torsional force.

To achieve the foregoing objects the present invention provides a thin hinge that includes a holding seat, an arc-shaped driven member and a torsional force generation assembly. The holding seat includes a base, a housing space formed on the base, an assembly portion located at one end of the base and a linear slide track located at another end of the base opposite to the assembly portion and communicating with the housing space. The arc-shaped driven member is located in the housing space and includes an operational portion, a curved portion connected to the operational portion and a driving portion extended from the curved portion toward the operational portion and coupled with the assembly portion to form a pivotal relationship. The torsional force generation assembly includes at least one driving arm located at the junction of the driving portion and the curved portion of the arc-shaped driven member, a slide seat connected to the driving arm and located in the housing space corresponding to the linear slide track, a detent plate located at another side of the linear slide track facing the housing space and corresponding to the slide seat, and at least one torsional spring corresponding to the detent plate and coupled with the slide seat and the detent plate to provide a torsional force while the slide seat is moved by the driving arm to slide on the linear slide track.

In one embodiment the base includes two brackets that are spaced from each other to define the housing space, and each bracket includes the linear slide track formed thereon.

In another embodiment the slide seat includes a plurality of installation plates located at two sides of the driving arm to clamp the driving arm between them. In addition, the torsional force generation assembly includes two sets of the driving arm that are assembled with the installation plates in a spaced and juxtaposed manner.

In yet another embodiment the driving portion is extended from the curved portion toward the operational portion and forms a deformation angle against a horizontal extension line of the operational portion.

In yet another embodiment the holding seat includes an axle located on the assembly portion to form a pivotal relationship with the driving portion.

In yet another embodiment the arc-shaped driven member includes a pivotal portion located at the junction of the driving portion and the curved portion and connected to the driving arm.

In yet another embodiment each torsional spring includes a plurality of elastic blades stacked on the detent plate and facing another side of the linear slide track, stacked at another side of the detent plate facing the linear slide track, a pintle run through the elastic blades to couple with the slide seat and the detent plate, and an adjustment member located on the pintle corresponding to the elastic blades to adjust tightness thereof to generate the torsional force.

Through the structure set forth above, the invention can provide advantageous features as follows:

1. With the arc-shaped driven member located in the housing space of the holding seat to change operation manner of the conventional hinge total structure of the thin hinge can be made thinner and flattened.

2. The torsional force generation assembly of the invention includes the torsional spring positioned corresponding to the slide seat so that the slide seat can be driven to slide on the linear slide track to receive the torsional force provided by the torsional spring. The torsional spring is not directly located on any axle of the hinge but providing the torsional force indirectly to the slide seat, hence the problem of change of the torsional force generated by the torsional spring caused by turning of the axle can be prevented.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
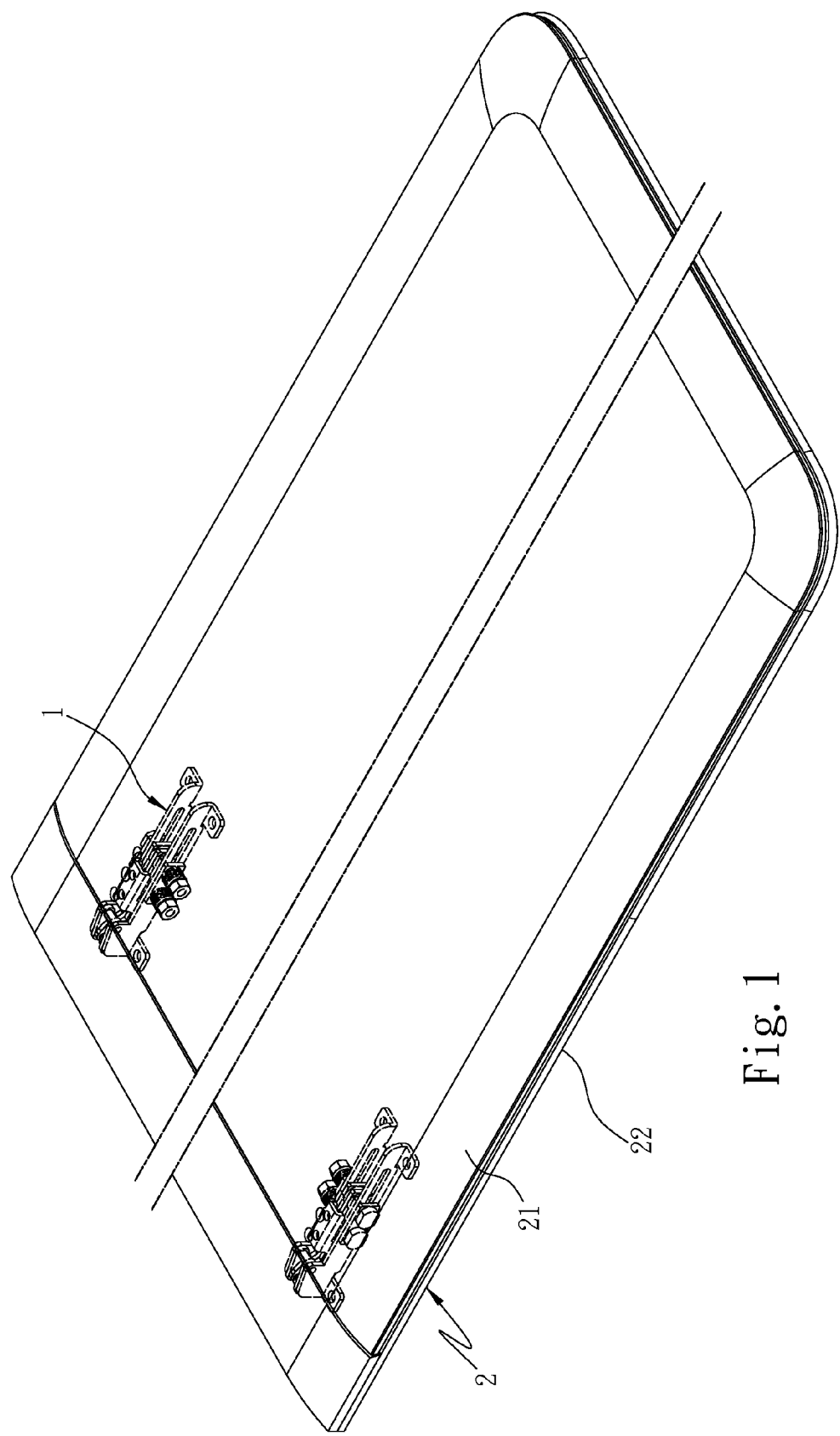
FIG. 1 is a schematic view of an embodiment of the invention assembled on an electronic device.
Figure 2:
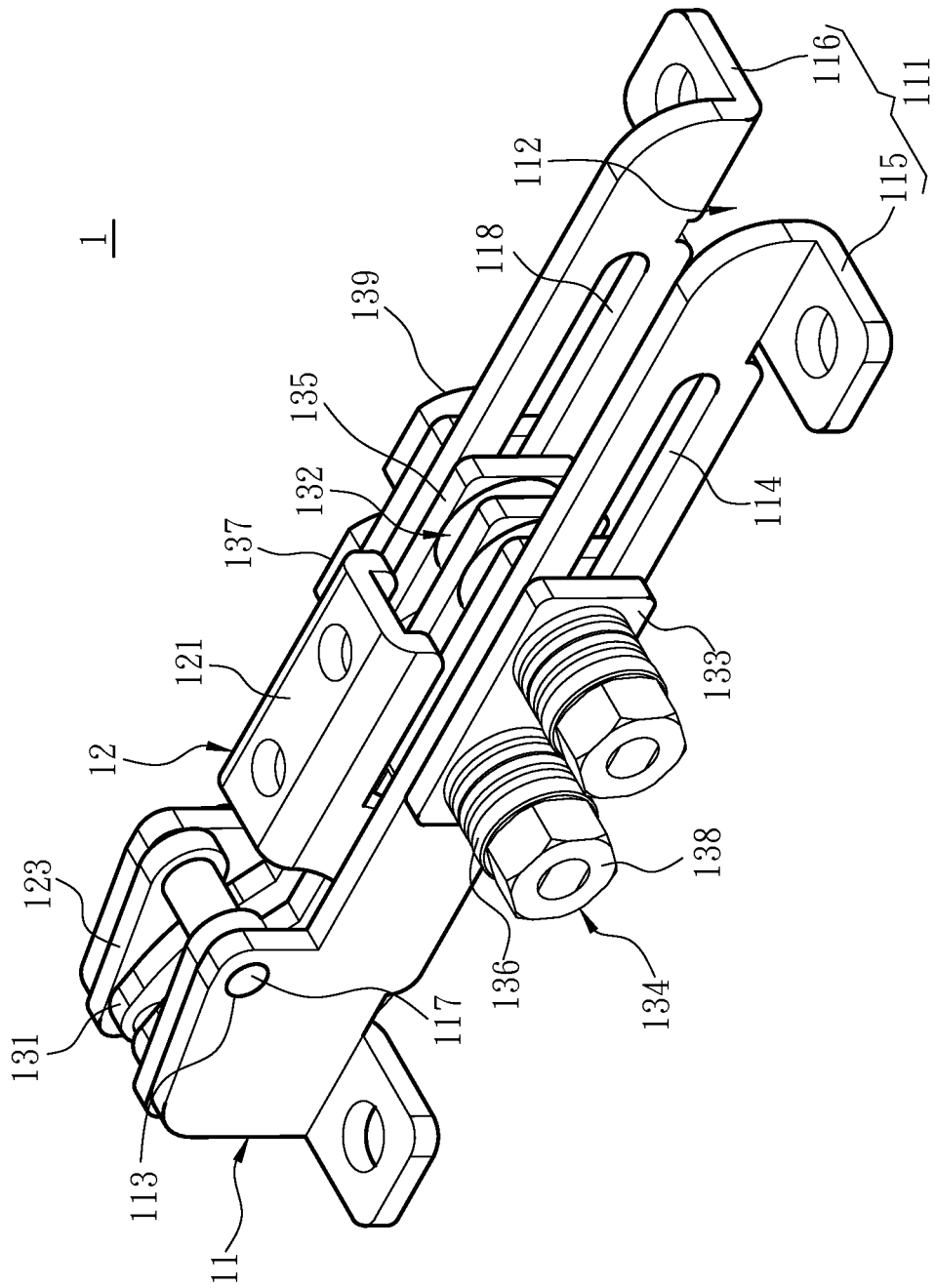
FIG. 2 is a schematic view of the structure of an embodiment of the invention.
Figure 3:
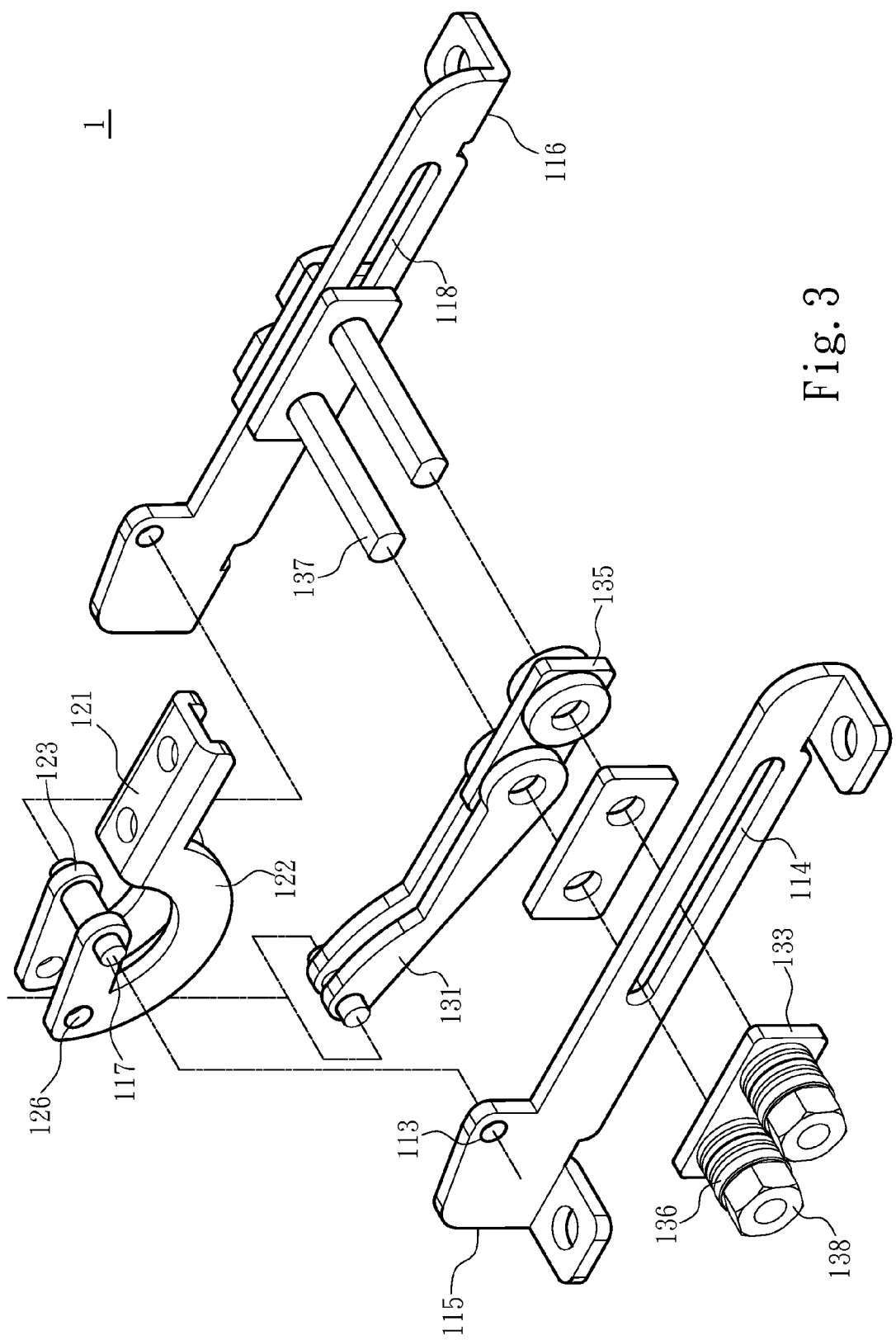
FIG. 3 is an exploded view of an embodiment of the invention.
Figure 4:
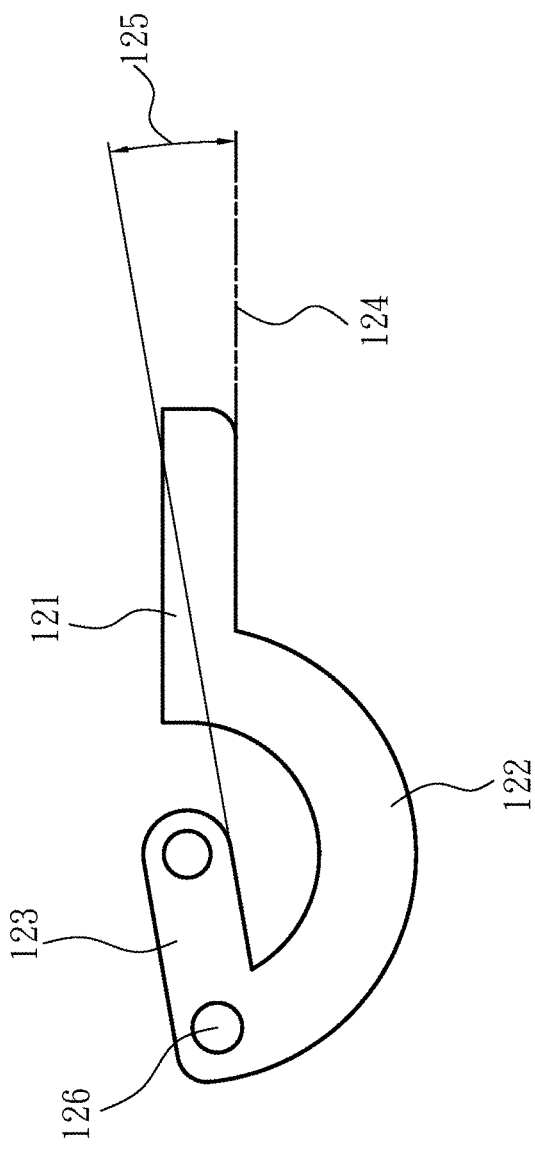
FIG. 4 is a schematic view of the arc-shaped driven member of an embodiment of the invention.

As shown in FIG. 1, the present invention aims to provide a thin hinge 1 that is installed on an electronic device 2 to bridge an upper case 21 and a lower case 22 such that the upper case 21 can be flipped against the lower case 22 through the thin hinge 1. The electronic device 2 can be a notebook computer or other information products adopted a flip-top design. More specifically, as shown in FIGS. 2 through 4, the thin hinge 1 includes a holding seat 11, an arc-shaped driven member 12 and a torsional force generation assembly 13. The holding seat 11 can be installed on the lower case 22 of the electronic device 2, and includes a base 111, a housing space 112 formed on the base 111, an assembly portion 113 located at one end of the base 111 and a linear slide track 114 located at another end of the base 111 opposite to the assembly portion 113 and communicating with the housing space 112. In addition, in one embodiment the base 111 includes two brackets 115 and 116 that are spaced from each other to define the housing space 112. The brackets 115 and 116 include respectively a linear slide track 114 and 118 formed thereon. The assembly portion 113 can be a hole formed on the base 111. The linear slide track 114 is formed in a horizontal linear locus.

The arc-shaped driven member 12 is located in the housing space 112 and includes an operational portion 121, a curved portion 122 connected to the operational portion 121 and a driving portion 123 extended from the curved portion 122 toward the operational portion 121 and coupled with the assembly portion 113 to form a pivotal relationship therewith. In addition, the arc-shaped driven member 12 can be coupled on the upper case 21 and be driven thereof. Moreover, the operational portion 121, the curved portion 122 and the driving portion 123 can be formed in an integrated manner. In practice, the operational portion 121 can be a linear tablet. The profile and curvature of the curved portion 122 can be changed according to actual requirement. The driving portion 123 can be extended toward the operational portion 121 and remote from the curved portion 122 to form a deformation angle 125 against a horizontal extension line 124 of the operational portion 121 as shown in FIG. 4, thereby to avoid structural interference among various elements that might otherwise hinder assembly. Furthermore, in another embodiment the holding seat 11 can include an axle 117 located on the assembly portion 113 to form a pivotal relationship with the driving portion 123.

Figure 5A:
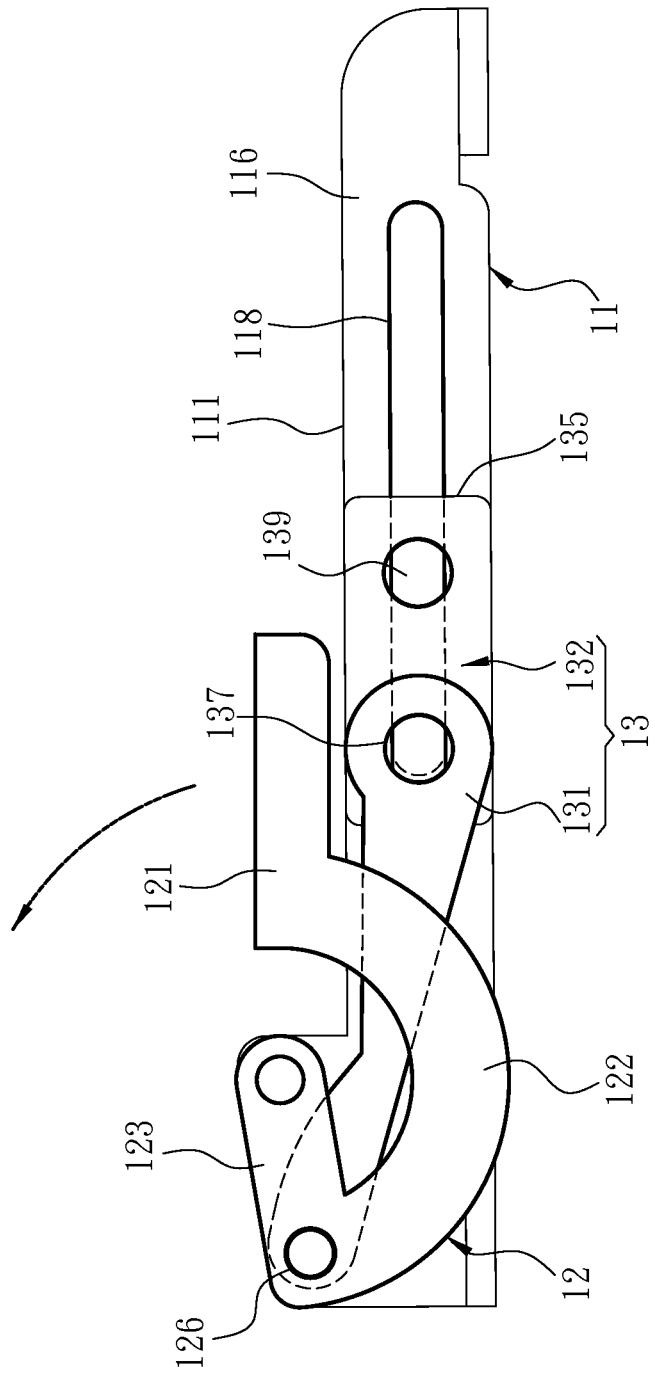
FIG. 5A is a schematic view of an embodiment of the invention in operating condition-1.

As shown in FIGS. 2, 3 and 4, the torsional force generation assembly 13 includes a driving arm 131 located at the junction of the driving portion 123 and the curved portion 122, a slide seat 132 connected to the driving arm 131 and located in the housing space 112 corresponding to the linear slide track 114, a detent plate 133 located at another side of the linear slide track 114 facing the housing space 112 and corresponding to the slide seat 132, and at least one torsional spring 134 corresponding to the detent plate 133 and coupled with the slide seat 132 and the detent plate 133 to provide a torsional force while the slide seat 132 is moved by the driving arm 131 to slide on the linear slide track 114. More specifically, in yet another embodiment the slide seat 132 further includes a plurality of installation plates 135 located at two sides of the driving arm 131 to clamp thereof, namely, the slide seat 132 can be constructed through the installation plates 135. In addition, in order to increase the structural strength of the slide seat 132 and the driving arm 131, in yet another embodiment the torsional force generation assembly 13 includes two sets of the driving arm 131 that are coupled with the installation plates 135 in a spaced and juxtaposed manner as shown in FIGS. 2 and 3. Moreover, each torsional spring 134 includes a plurality of elastic blades 136 stacked on the detent plate 133 facing another side of the linear slide track 114, a pintle 137 run through the elastic blades 136 to couple with the slide seat 132 and the detent plate 133, and an adjustment member 138 located on the pintle 137 corresponding to the elastic blades 136 to adjust tightness of thereof to generate the torsional force. In yet another embodiment the adjustment member 138 can be a nut, and by wrenching the adjustment member 138 it can be moved on the pintle 137 to compress the elastic blades 136 to generate a greater torsional force, or loosen the elastic blades 136 to generate a smaller torsional force. On the other hand, the arc-shaped driven member 12 includes a pivotal portion 126 located at the junction of the driving portion 123 and the curved portion 122 to couple with the driving arm 131. The pivotal portion 126 can be a hole or a strut. In addition, in yet another embodiment, in order to facilitate smooth sliding of the slide seat 132 on the linear slide track 114 the torsional force generation assembly 13 can be implemented with two sets of torsional springs 134 and 139, through them even torsional forces can be rendered to the slide seat 132 to avoid applying the torsional force merely on a single portion of the slide seat 132 via a single torsional spring 134 that might otherwise cause unsmooth sliding of the slide seat 132. Moreover, the driving arm 131 can further form a geometric chamfered angle at one side thereof facing the assembly portion 113 as shown in FIG. 5A, thereby to avoid the driving arm 131 from over exposing the thin hinge when driven by the driving portion 123 in motion that might otherwise cause interference with other elements of the electronic device 2 or hinder user operation. In practice the position and style of the geometric chamfered angle can be adjusted as desired according to requirements.

Figure 5B:
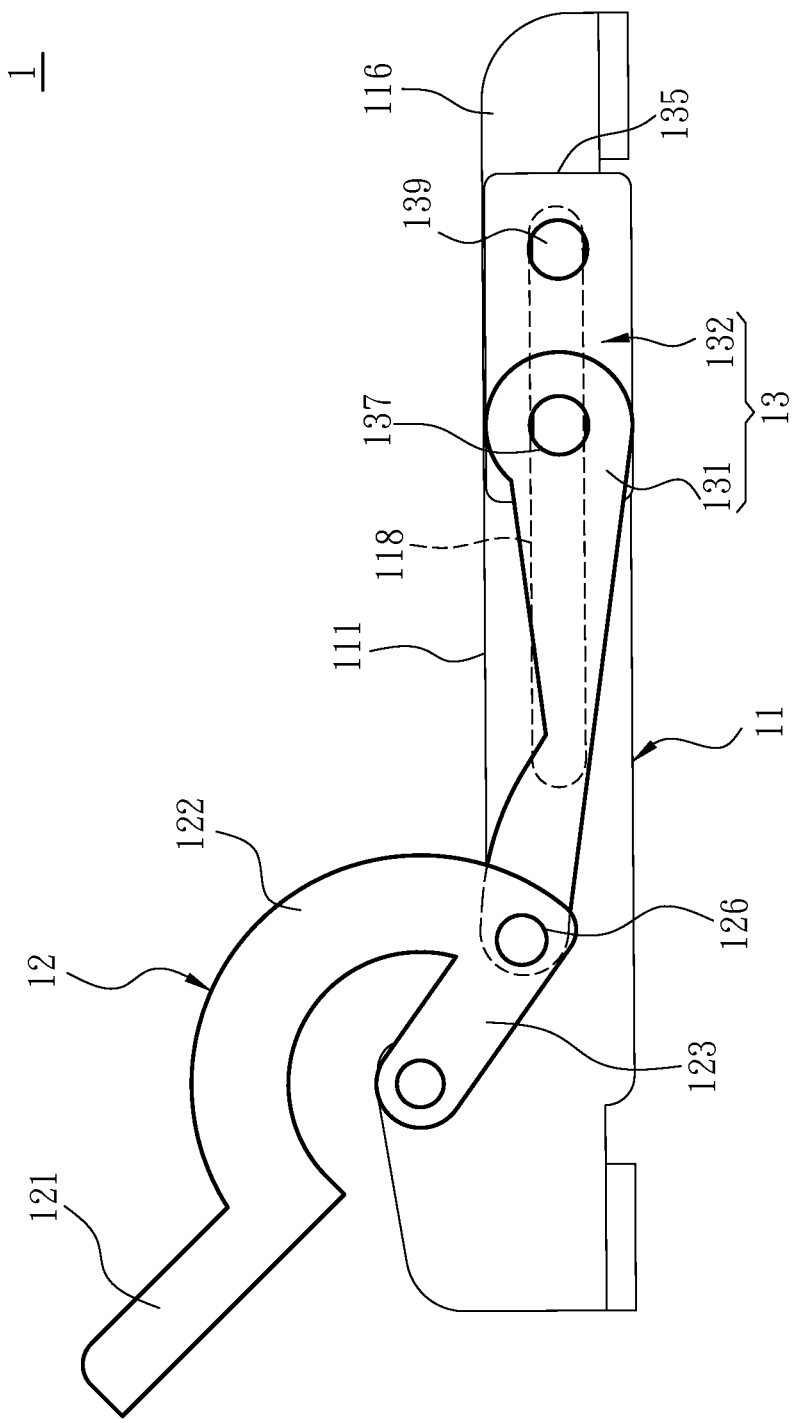
FIG. 5B is a schematic view of an embodiment of the invention in operating condition-2.

As shown in FIGS. 5A and 5B, in order to facilitate discussion of implementation of the thin hinge 1, first, presumed that the thin hinge 1 is in an unused state, namely, the arc-shaped driven member 12 is not yet being flipped against the holding seat 11, as shown in FIG. 5A. At this state the arc-shaped driven member 12 is parallel with the holding seat 11. When the operational portion 121 is driven by an external force and flips in a direction remote from the holding seat 11, the operational portion 121 also drives at the same time the curved portion 122 so that the driving portion 123 swivels at a corresponding range that in turn pushes the driving arm 131 to move the slide seat 132 along the linear slide track 114 away the driving portion 123, and during the slide seat 132 slides on the linear slide track 114 the torsional spring 134 provides a torsional force to limit the slide speed of the slide seat 132 so that too fast movement of the thin hinge 1 can be averted to prevent structural damage that might otherwise occur.

As a conclusion, the thin hinge of the invention includes a holding seat, an arc-shaped driven member and a torsional force generation assembly. The holding seat includes a base, a housing space formed on the base, an assembly portion located at one end of the base and a linear slide track located at another end of the base opposite to the assembly portion and communicating with the housing space. The arc-shaped driven member is located in the housing space and includes an operational portion, a curved portion connected to the operational portion and a driving portion extended from the curved portion toward the operational portion and coupled with the assembly portion to form a pivotal relationship. The torsional force generation assembly includes at least one driving arm located at the junction of the driving portion and the curved portion, a slide seat connected to the driving arm corresponding to the linear slide track and located in the housing space, a detent plate located at another side of the linear slide track facing the housing space and corresponding to the slide seat, and at least one torsional spring corresponding to the detent plate and coupled with the slide seat and the detent plate to provide a torsional force while the slide seat is moved by the driving arm to slide on the linear slide track. As a result, the thin hinge can be made thinner and flattened, and also be modularized in implementation.

What is claimed is:

1. A thin hinge, comprising:
    a holding seat including a base, a housing space formed on the base, an assembly portion located at one end of the base and a linear slide track located at another end of the base opposite to the assembly portion and communicating with the housing space;
    an arc-shaped driven member which is located in the housing space and includes an operational portion, a curved portion connected to the operational portion and a driving portion extended from the curved portion toward the operational portion and connected to the assembly portion to form a pivotal relationship therewith; and
    a torsional force generation assembly including at least one driving arm pivotaly connected to the junction of the driving portion and the curved portion, a slide seat connected to the driving arm and located in the housing space corresponding to the linear slide track, a detent plate located at another side of the linear slide track facing the housing space and corresponding to the slide seat, and at least one torsional spring corresponding to the detent plate and coupled with the slide seat and the detent plate to provide a torsional force while the slide seat is moved by the driving arm to slide on the linear slide track.

2. The thin hinge of claim 1, wherein the base includes two brackets that are spaced from each other to define the housing space, the linear slide track being formed on each bracket.

3. The thin hinge of claim 2, wherein the slide seat includes a plurality of installation plates located at two sides of the driving arm to clamp the driving arm.

4. The thin hinge of claim 3, wherein the torsional force generation assembly includes two sets of the driving arm, the two driving arms and the installation plates being assembled in a spaced and juxtaposed manner.

5. The thin hinge of claim 4, wherein the driving portion is extended from the curved portion toward the operational portion and forms a deformation angle against a horizontal extension line of the operational portion.

6. The thin hinge of claim 5, wherein the holding seat includes an axle located on the assembly portion to form a pivotal relationship with the driving portion.

7. The thin hinge of claim 6, wherein the arc-shaped driven member includes a pivotal portion located at the junction of the driving portion and the curved portion to couple with the driving arm.

8. The thin hinge of claim 7, wherein each torsional spring includes a plurality of elastic blades stacked on the detent plate facing another side of the linear slide track, a pintle run through the elastic blades to couple with the slide seat and the detent plate, and an adjustment member located on the pintle corresponding to the elastic blades to adjust tightness thereof to generate the torsional force.

9. The thin hinge of claim 1, wherein the driving portion is extended from the curved portion toward the operational portion and forms a deformation angle against a horizontal extension line of the operational portion.

10. The thin hinge of claim 1, wherein the holding seat includes an axle located on the assembly portion to form a pivotal relationship with the driving portion.

11. The thin hinge of claim 1, wherein the arc-shaped driven member includes a pivotal portion located at the junction of the driving portion and the curved portion to couple with the driving arm.

12. The thin hinge of claim 1, wherein each torsional spring includes a plurality of elastic blades stacked on the detent plate facing another side of the linear slide track, a pintle run through the elastic blades to couple with the slide seat and the detent plate, and an adjustment member located on the pintle corresponding to the elastic blades to adjust tightness thereof to generate the torsional force.

* * * * *